United States Patent [19]
Shimomura et al.

[11] Patent Number: 5,623,713
[45] Date of Patent: Apr. 22, 1997

[54] SELF-REPARIR TYPE IMAGE FORMING APPARATUS UTILIZING FUNCTIONAL REPRESENTATION

[75] Inventors: Yoshiki Shimomura; Sadao Tanigawa; Yukihiro Mori; Toshimitsu Takakura, all of Osaka; Yasushi Umeda, Tama; Tetsuo Tomiyama; Hiroyuki Yoshikawa, both of Tokyo, all of Japan

[73] Assignee: Mita Industrial Co., Ltd., Osaka, Japan

[21] Appl. No.: 403,423

[22] Filed: Mar. 14, 1995

[30] Foreign Application Priority Data

Mar. 18, 1994 [JP] Japan ......................................... 6-49309

[51] Int. Cl.$^6$ ................................................... G03G 21/00
[52] U.S. Cl. ................................................ 399/42; 395/904
[58] Field of Search ......................................... 355/204, 205, 355/207; 395/912, 916, 183.1, 183.2, 904; 364/276.3, 281.9

[56] References Cited

U.S. PATENT DOCUMENTS

| | | | |
|---|---|---|---|
| 5,166,934 | 11/1992 | Tomiyama et al. | 364/276.3 X |
| 5,239,547 | 8/1993 | Tomiyama et al. | 395/911 |
| 5,317,368 | 5/1994 | Shimomura et al. | 355/207 |
| 5,396,314 | 3/1995 | Umeda et al. | 355/207 |
| 5,446,523 | 8/1995 | Shimomura et al. | 355/207 |
| 5,463,545 | 10/1995 | Umeda et al. | 355/207 X |

FOREIGN PATENT DOCUMENTS

| | | |
|---|---|---|
| 0551631A2 | 7/1993 | European Pat. Off. . |
| 0564711A2 | 10/1993 | European Pat. Off. . |

OTHER PUBLICATIONS

"Sensitivity Engineering" by Sansei Nagamachi, published by Kaibundo Publishing Co., Ltd. (1988), including a cover page, pp. 46 through 60, and an imprint page. No English Translation.

"Reliability Engineering", by Hiroyuki Yoshikawa, published by Corona Publishing Co., Ltd. (1979), including a cover page, pp. 5 through 21, and an imprint page. No English Translation.

European Search Report No. EP 95 10 3872 completed 2 Jul. 1996.

*Primary Examiner*—Nestor R. Ramirez
*Attorney, Agent, or Firm*—Beveridge, DeGrandi, Weilacher & Young, LLP

[57] ABSTRACT

The present invention makes it possible to make good self-repair on which little secondary effect is exerted by calculating a manipulated variable of a parameter at the time of the repair by a functional amount in an image forming apparatus having a self-repair function. When a fault occurs, control-type repair for operating a physical parameter is first made. In this repair, the physical parameter to be operated is searched for (n3). If the physical parameter to be operated is determined, a manipulated variable of the physical parameter is then calculated by a functional amount (n4). The manipulated variable of the parameter by the functional amount is determined by adjusting the degree to which a plurality of functions are developed. Therefore, a manipulated variable in which the development of the functions is most preferable as the entire apparatus is determined. If the fault cannot be repaired by the control type repair, functional redundancy type repair is made (n6, n7, n8, n9). In the functional redundancy type repair, priorities to repair candidates are determined by the functional amount.

2 Claims, 15 Drawing Sheets

FIG. 2E
SCANNER SECTION
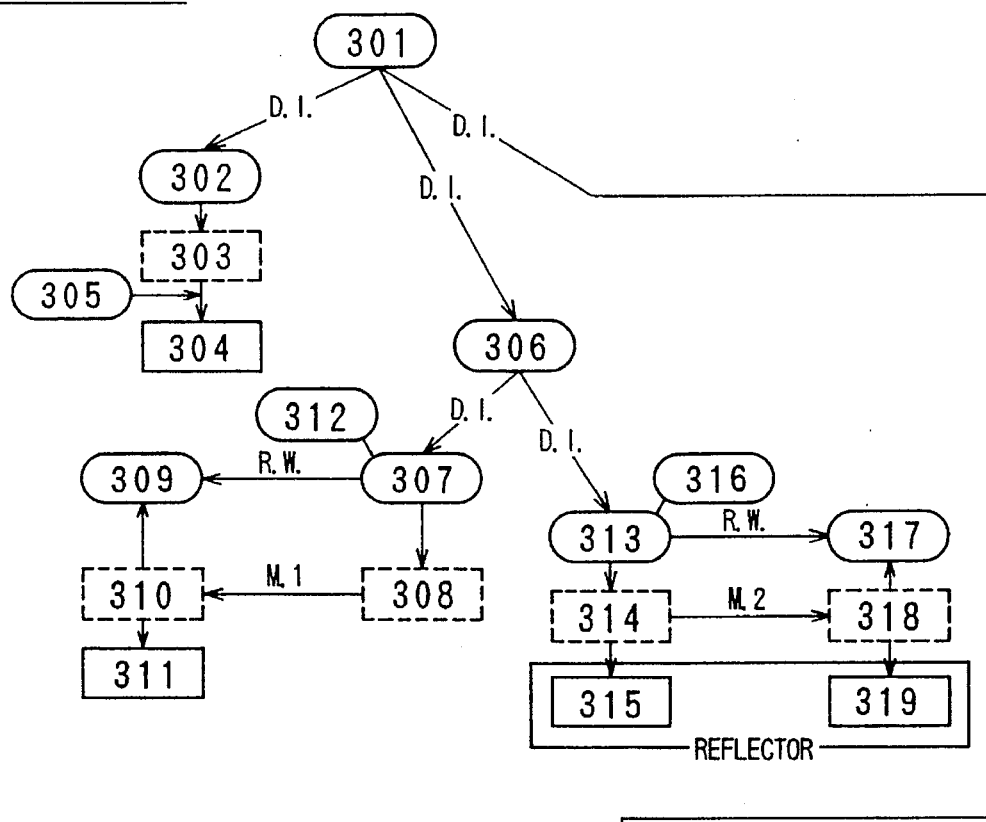
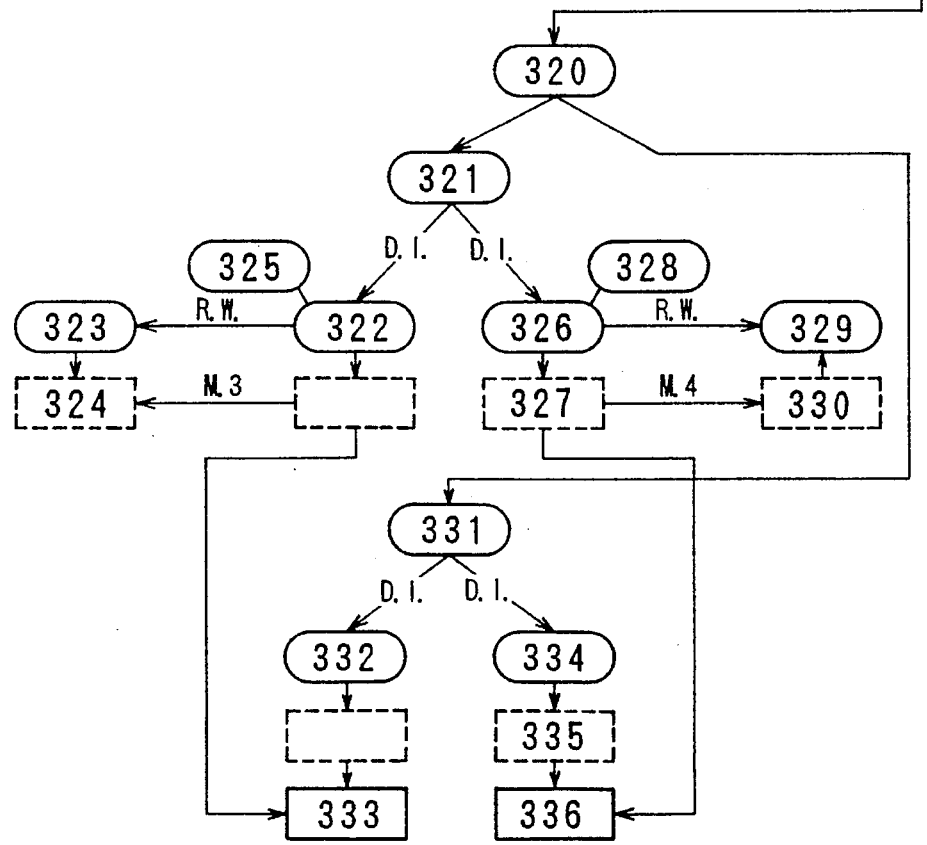

PAPER FEEDING SECTION

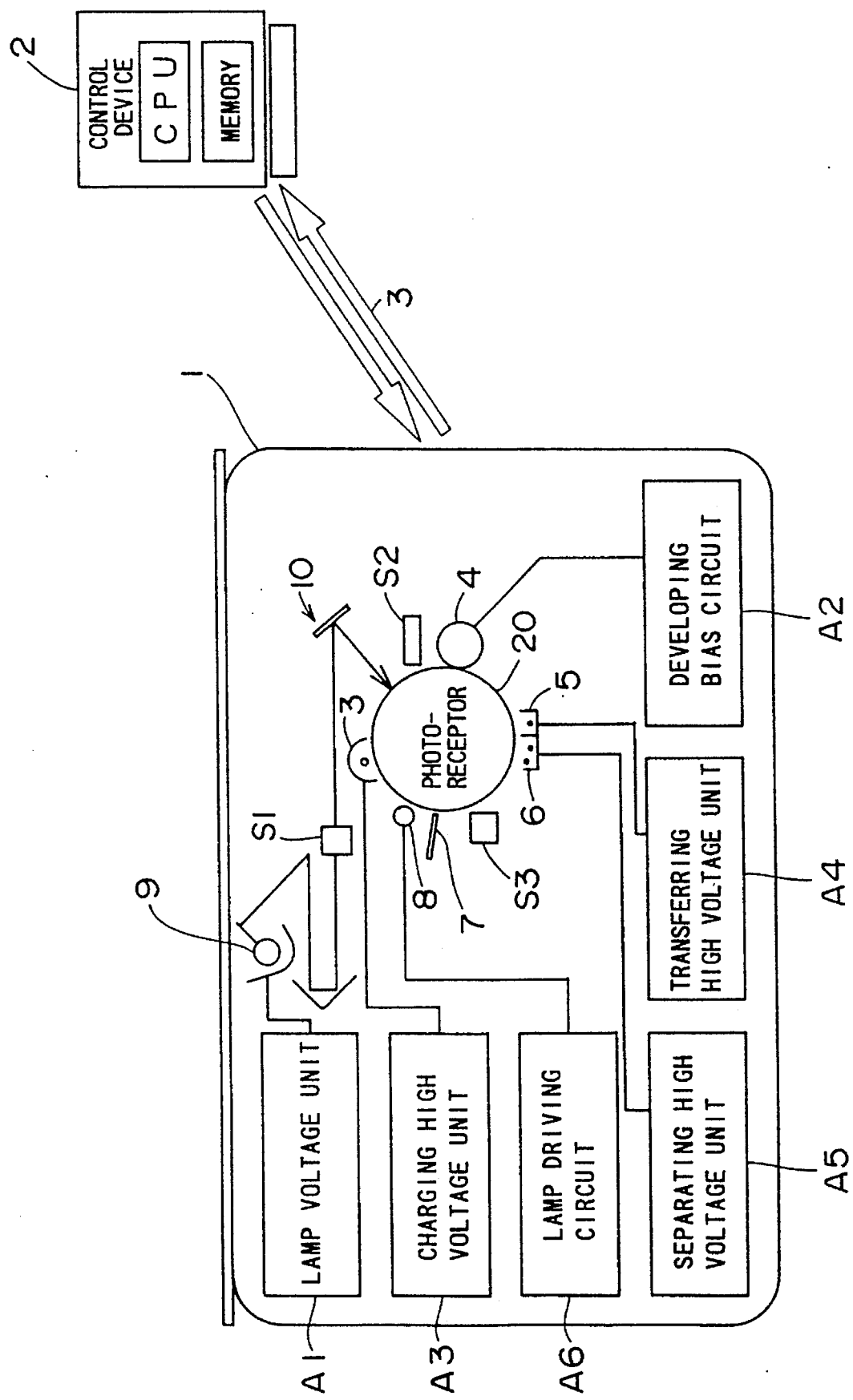

FIG. 4

| MEMORY | |
|---|---|
| D 1 | FUNCTIONAL AMOUNT DATA |
| D 2 | OBJECTIVE MODEL DATA |
| D 3 | REPAIR OPERATION KNOWLEDGE |
| D 4 | QUANTITATIVE INFORMATION ON OBJECTIVE MACHINE |
| D 5 | FAULT JUDGMENT KNOWLEDGE |
| D 6 | FUNCTION EXPANDING STRUCTURE DATA |
| S 1 | DIGITAL SIGNAL/SYMBOL CONVERSION PROGRAM |
| S 2 | FAULT DIAGNOSIS PROGRAM |
| S 3 | SIMULATION PROGRAM |
| S 4 | FUNCTIONAL AMOUNT CONVERSION/JUDGMENT PROGRAM |
| S 5 | FUNCTIONAL REDUNDANCY CANDIDATE SEARCH PROGRAM |
| S 6 | PARAMETER REPAIR CANDIDATE SEARCH PROGRAM |
| S 7 | SYMBOL/DIGITAL SIGNAL CONVERSION PROGRAM |
| S 8 | QUALITATIVE SEQUENCE FORMATION PROGRAM |
| S 9 | QUANTITATIVE SEQUENCE FORMATION PROGRAM |

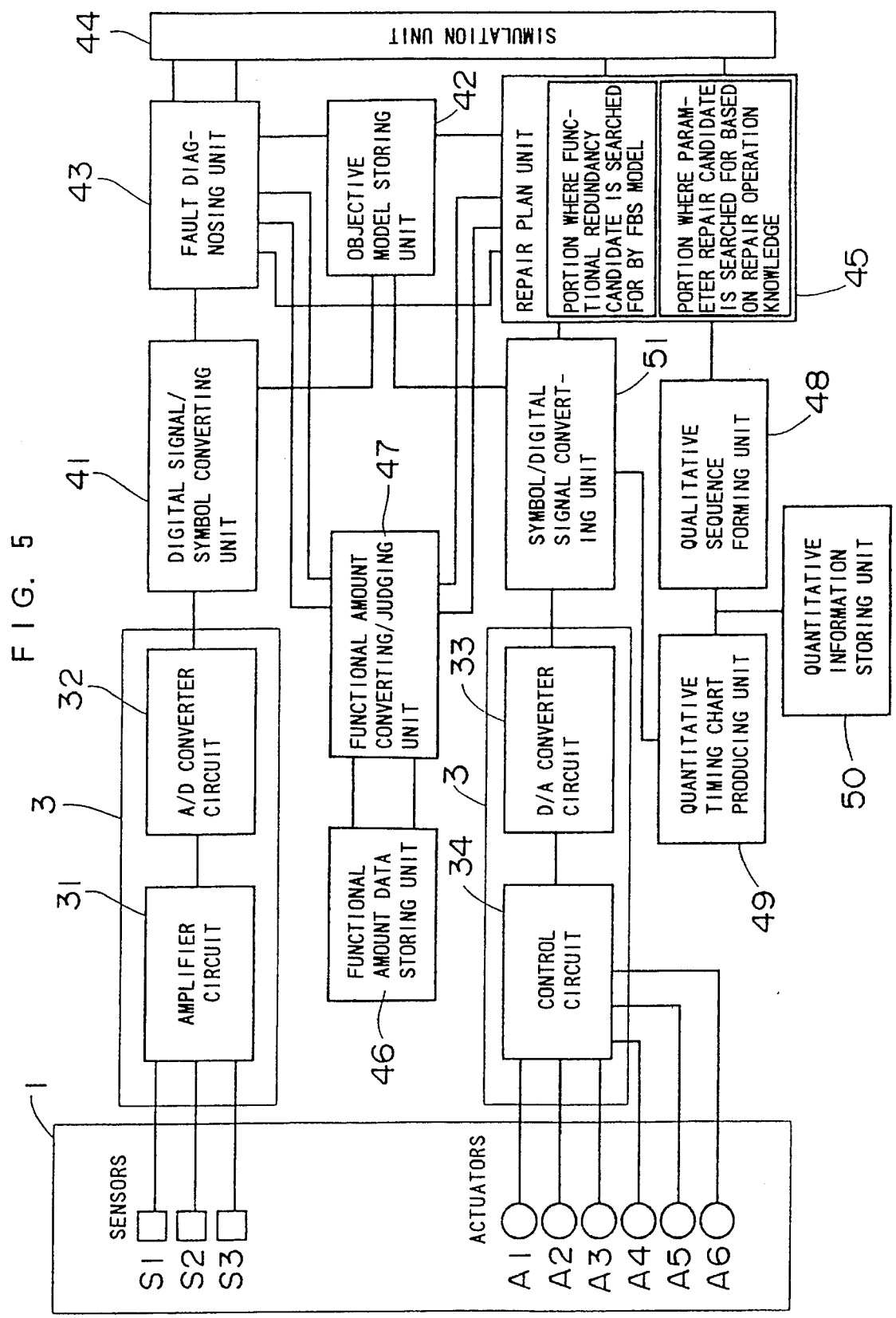

F I G. 7

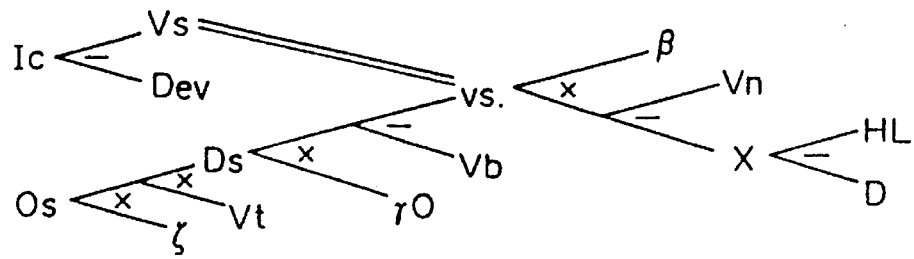

- O s ⋯ OUTPUT IMAGE DENSITY
- ζ ⋯ PAPER SENSITIVITY
- V t ⋯ OUTPUT OF TRANSFERRING CORONA DISCHARGER
- D s ⋯ TONER DENSITY ON DRUM
- γ 0 ⋯ TONER SENSITIVITY
- V s ⋯ SURFACE POTENTIAL OF DRUM AFTER EXPOSURE
- I c ⋯ IMAGE CONTRAST
- V b ⋯ DEVELOPING BIAS OUTPUT
- β ⋯ DRUM LIGHT SENSITIVITY
- V n ⋯ OUTPUT OF MAIN CHARGER
- X ⋯ HALOGEN LAMP QUANTITY OF LIGHT ON OPTICAL PATH
- H L ⋯ OUTPUT OF HALOGEN LAMP
- D ⋯ DOCUMENT DENSITY
- D ev ⋯ SENSITIVITY OF DEVELOPING AGENT

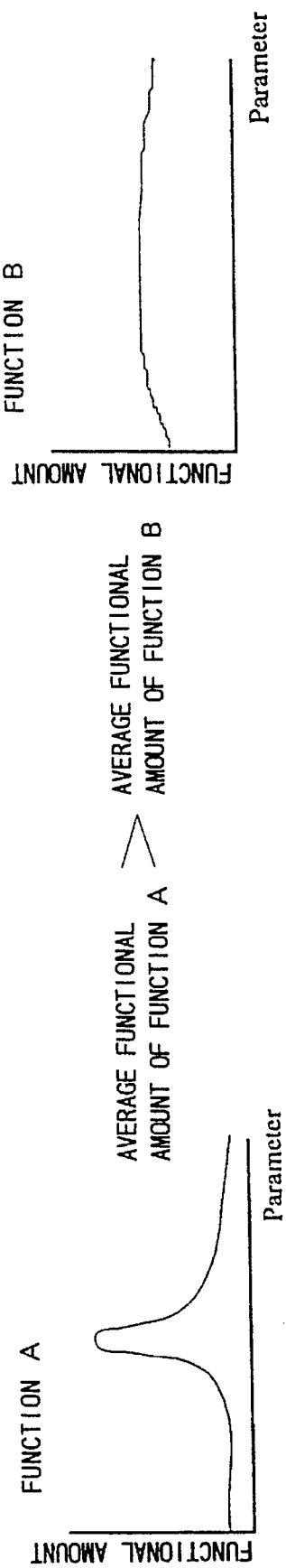

1

SELF-REPARIR TYPE IMAGE FORMING APPARATUS UTILIZING FUNCTIONAL REPRESENTATION

BACKGROUND OF THE INVENTION

1. Field of the Invention

The present invention relates to an image forming apparatus having a self-repair function for repairing a fault, when there occurs such a fault that a predetermined function is not sufficiently developed.

2. Description of the Related Art

In the field of an image forming apparatus such as a copying machine, it is proposed that a so-called self-repair function is added. The self-repair function is a function aiming at "functional maintenance" by fault diagnosis of a functional portion related to image formation and repair of a function. The prior art of an apparatus having such a self-repair function is disclosed in U.S. patent application Ser. No. 07/588,191 issued as U.S. Pat. No. 5,166,934), for example, according to the prior application of the present applicant.

In the prior art, an image forming apparatus to be self-repaired is represented as a cause and effect relation among a plurality of physical parameters, a physical parameter to be operated at the time of a fault is searched for on the basis of qualitative inference, and the physical parameter is operated, to repair the fault.

Furthermore, as the other prior art, a functional redundancy type image forming apparatus with a self-repair function is disclosed in U.S. patent application Ser. No. 07/989,512 (issued as U.S. Pat. No. 5,396,314), for example, according to the prior application of the present applicant. Self-repair based on functional redundancy is to develop, when a fault occurs in an apparatus, a function which should have been developed by a certain part which failed by utilizing the potential function of a part which originally existed in the apparatus.

In either self-repair type image forming apparatus according to the prior art, the construction thereof is new and epoch-making in that the fault is self-repaired. However, it is difficult to determine a manipulated variable of a physical parameter at the time of repairing the fault. Specifically, a physical parameter to be operated so as to repair the fault and an alternative part can be satisfactorily raised. However, it is impossible to determine a manipulated variable of a physical parameter, determine a manipulated variable when there are a plurality of alternative parts, and suitably select a part on which little secondary effect is exerted.

SUMMARY OF THE INVENTION

Therefore, an object of the present invention is to provide a self-repair type image forming apparatus so improved as to be more suitably self-reparable by adding quantitative representation based on a functional amount to a function mode representing its function developed state.

In accordance with an aspect, the present invention provides, in an image forming apparatus having a self-repair function for self-repairing the fault, when there occurs such a fault that a predetermined function is not sufficiently developed, a self-repair type image forming apparatus utilizing functional representation which is characterized by comprising first storing means storing a function expanding structure in which at least a portion to be self-repaired is represented as a network comprising a hierarchical structure of a plurality of functions and a plurality of behaviors and states realizing the plurality of functions, and predetermined functions belonging to a relatively lower-order hierarchy are respectively assigned functional modifiers for modifying the functions, second storing means storing functional amount data, which is previously examined in conformity with each of the functional modifiers, representing the change in a functional amount with the change of a predetermined physical parameter, third storing means storing a parameter tree in which at least a portion to be self-repaired is represented by a cause and effect relation among a plurality of physical parameters, means for applying, when a fault occurs, the state of the fault to the parameter tree stored in the third storing means, to raise a physical parameter to be operated so as to repair the fault, means for calculating a manipulated variable of the raised physical parameter on the basis of the functional amount data stored in the second storing means, and means for operating the raised physical parameter to self-repair the function on the basis of the calculated manipulated variable.

In this aspect, when the physical parameter to be operated in a case where the fault occurs is raised, the manipulated variable of the raised physical parameter is calculated on the basis of the functional amount data. In calculating the manipulated variable on the basis of the functional amount data, the manipulated variable is so determined that a desired function is performed as a whole by adjusting the degree to which the plurality of functions are developed. Therefore, a desired image formed state is obtained after the repair.

In accordance with another aspect, the present invention is characterized by further comprising means for raising, when the fault cannot be repaired by operating the physical parameter, an alternative part having as a potential function a function which is not developed due to the fault on the basis of the function expanding structure stored in the first storing means, means for selecting, when a plurality of alternative parts are raised, a part suitable for function development on the basis of the functional amount data stored in the second storing means, and redundancy function development controlling means for developing the function which is not developed due to the fault by the selected part.

In this aspect, when the repair based on the functional redundancy is made, a part on which little secondary effect is exerted is selected out of the plurality of alternative parts each capable of developing a potential function on the basis of the functional amount data. Therefore, a suitable alternative part can be selected in a short time, thereby to make it possible to reduce time required for the repair.

As described in the foregoing, according to the present invention, the concept "a functional modifier" is introduced as a restrictive factor for modifying a major function, to devise a method of representation further reflecting the intention of a designer when the function of an objective machine is expanded. Therefore, the intention of the designer which is not satisfied with the conventional FBS diagram can be clearly represented by using the functional modifier. Furthermore, the functional modifier can be represented quantitatively by the functional amount, thereby to make it possible to represent the objective machine objectively as well as carry out such control that the objective machine develops a desired function using a computer. That is, it is possible to automatically and accurately realize the fault diagnosis and the repair of the objective machine using a computer.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2E is a diagram showing a function expanding structure of a scanner section in the copying machine;

FIG. 3 is a conceptual diagram showing the construction of a self-repair type copying machine to which one embodiment of the present invention is applied;

FIG. 4 is a diagram showing the contents stored in a memory included in a control device 2;

FIG. 5 is a block diagram for explaining the construction of the control device 2;

FIG. 7 is a diagram showing a parameter tree used for judgment related to a secondary effect;

FIG. 9 is a diagram for explaining the relationship between functional amount data and an average functional amount.

DESCRIPTION OF THE PREFERRED EMBODIMENTS

Figure 1:
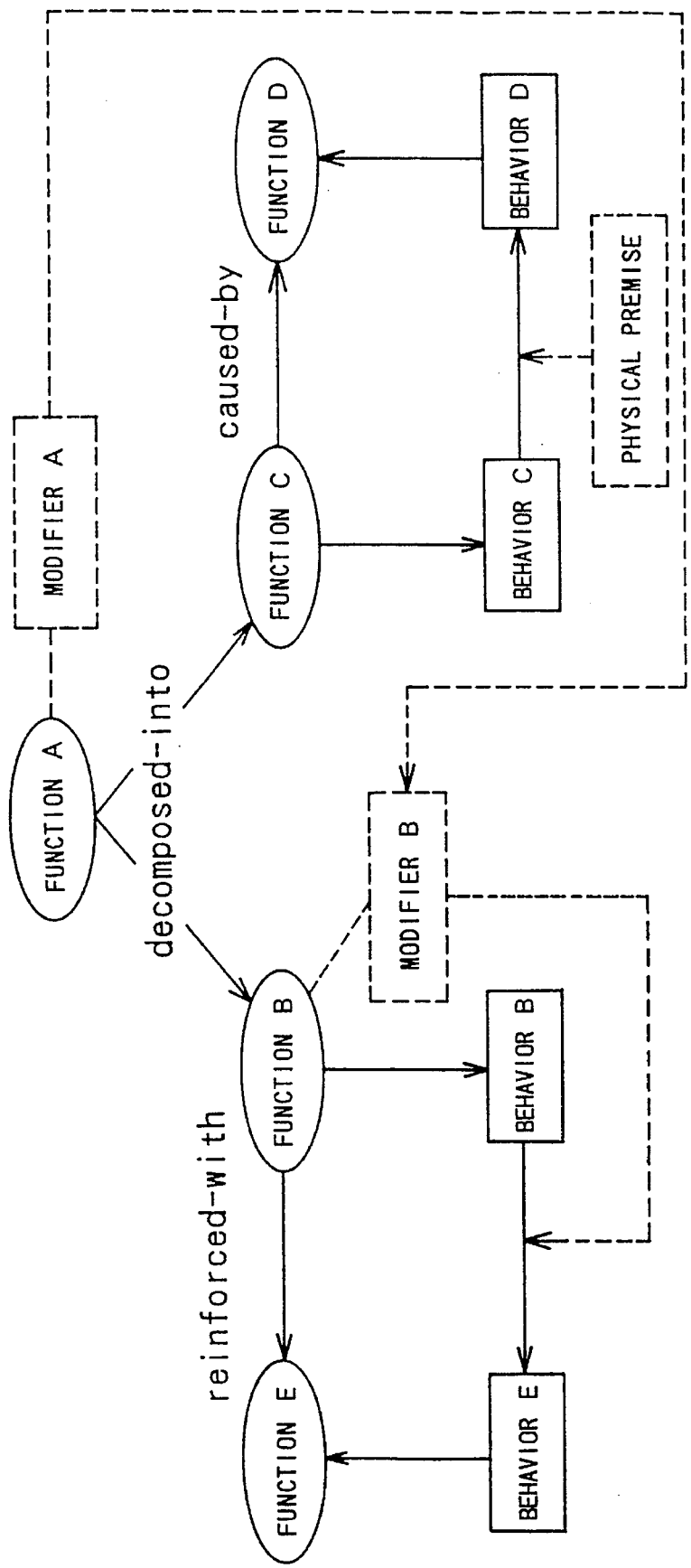
FIG. 1 is a diagram showing an example in which a function A is expanded using function expansion by task division, function expansion by a cause and effect relation, and function expansion by a modifier.

The concept "functional representation based on a functional amount" which is the premise of the present invention and the concepts "a functional modifier" and "a function expanding structure" which are introduced by the present invention will be described, and then a self-repair type copying machine according to one embodiment of the present invention will be described.

Functional Representation Based on Functional Amount

In the case of design or maintenance, an FBS (function-behavior-state) diagram has been known as one of methods of representing an objective machine on a computer. In the FBS diagram, an objective machine is represented by a network comprising a hierarchical structure of a plurality of functions and a plurality of behaviors and states realizing the plurality of functions. The function is defined as description of a behavior which a human being recognized and abstracted with a certain object. If the function of a machine to be designed is modeled using the FBS diagram, therefore, the function has a hierarchical structure comprising an entire function and a partial function, as described above. Examples of expansion from the entire function to the partial function include one caused by task division made by abstract recognition of a designer and one caused by interpolation based on a physical cause and effect relation.

If the objective machine is modeled, however, the representation of the objective machine by only the relation between the two functions is insufficient for functional maintenance using a computer. The reason for this is that in the functional maintenance, the design process such as the basis for selection in establishing a correspondence between a function and a behavior and the change in a representation unit of the function used at the time of the design must be simultaneously represented. Specifically, specifications in the design are applied from the exterior, which are not complete. If the process for defining an ambiguous specification is considered to be also included in the design and the process for defining the specification is treated as one included in "the intention of a designer", therefore, the process for defining the specification must be also represented by the function. If the functional maintenance using a computer is thus considered, the representation of the intention of the designer must be also included in the functional representation.

In the method of representing the objective machine using the FBS diagram, however, the intention of the designer is not described. Therefore, information is insufficient to make an attempt to carry out functional maintenance based on the FBS diagram using a computer.

The inventors of the present application have devised a method of representing the function of an objective machine along the intention of a designer by classifying the function into a function body directly representing an object and a functional modifier for modifying the function body to increase the ability to represent the function.

Functional Modifier

Both "beautifully" and "simultaneously" are modifying representation seen in functional representation. The representation "simultaneously" restricts the relation between functions (behaviors). That is, the representation is caused when a function is expanded to a lower-order function to restrict a partial structure of the function. Such restriction on the relation between partial functions is referred to as a "functional relation (FR)".

On the other hand, the representation "beautifully" is representation aiming at modifying a major function to enhance the ability to describe the specification of the function. The restriction caused by the representation becomes the basis for selection as to which of the behaviors corresponds to the major function. Alternatively, the physical basic structure of an object including a correspondence between the major function and the behavior is determined, after which dependent restriction on a state (or a behavior) is embodied. Such restrictive representation is referred to as a "functional modifier (FM)".

In the functional representation using the functional modifier, a designer controls the function of an objective machine and a representation unit of the function by using the functional modifier, and finally embodies both the function and the modifier, thereby to make it possible to define a required specification of the objective machine.

The expansion of a function using a functional modifier includes the following three expanding methods:

(1) Function expansion by task division (2) Function expansion by a cause and effect relation (3) Function expansion by a modifier The relation between functions which is the result of the function expansion is defined as follows:
(1) a decomposed—into relation
(2) a caused—by relation
(3) a reinforced—with relation.

FIG. 1 illustrates an example in which a function A is expanded using the above described method.

Referring to FIG. 1, the function A is first expanded to partial functions B and C by task division. If a behavior C is selected as a realization behavior of the function C, a behavior D required to realize the behavior C is selected by a designer. A function is extracted mainly for the purpose of description with respect to the behavior D. The result of the extraction is a function D, so that the function D is connected to the function C by the caused—by relation.

On the other hand, if the behavior B is selected as a realization behavior of the function B, a behavior E is selected by a designer so as to improve the degree of replenishment of the use with the behavior B. The behavior E is a so-called behavior for restricting and reinforcing the range of the behavior B which is given by modifying the function B by a functional modifier B which is a concrete form of the functional modifier A. A function is extracted also with respect to the behavior E, similarly to the behavior D. The result of the extraction is connected by the reinforced with relation.

Function Expanding Structure of Copying Machine

A concrete example of a function expanding structure of a copying machine using the task division, the cause and effect relation and the functional modifier is shown in FIGS. 2A to 2G.

Figure 2A:
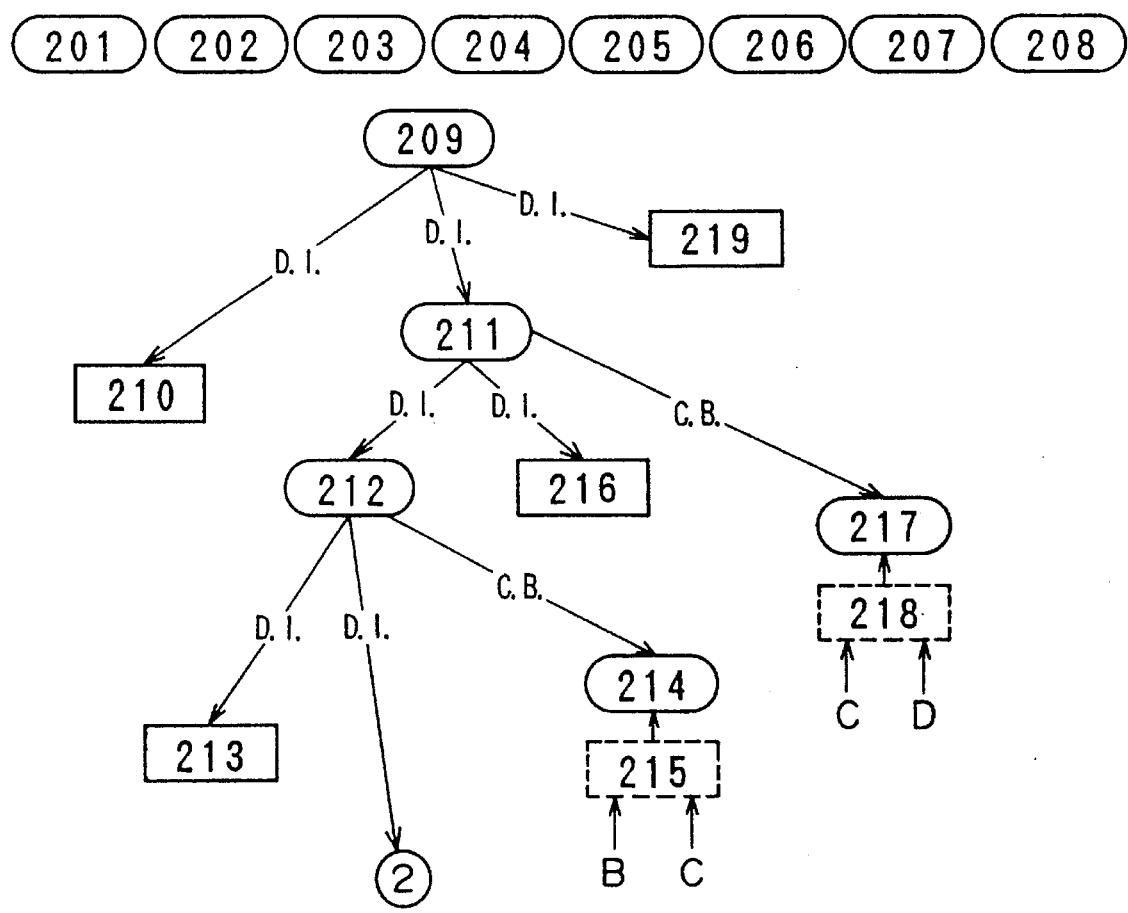
FIG. 2A is a diagram showing a whole function expanding structure in a copying machine.
Figure 2B:
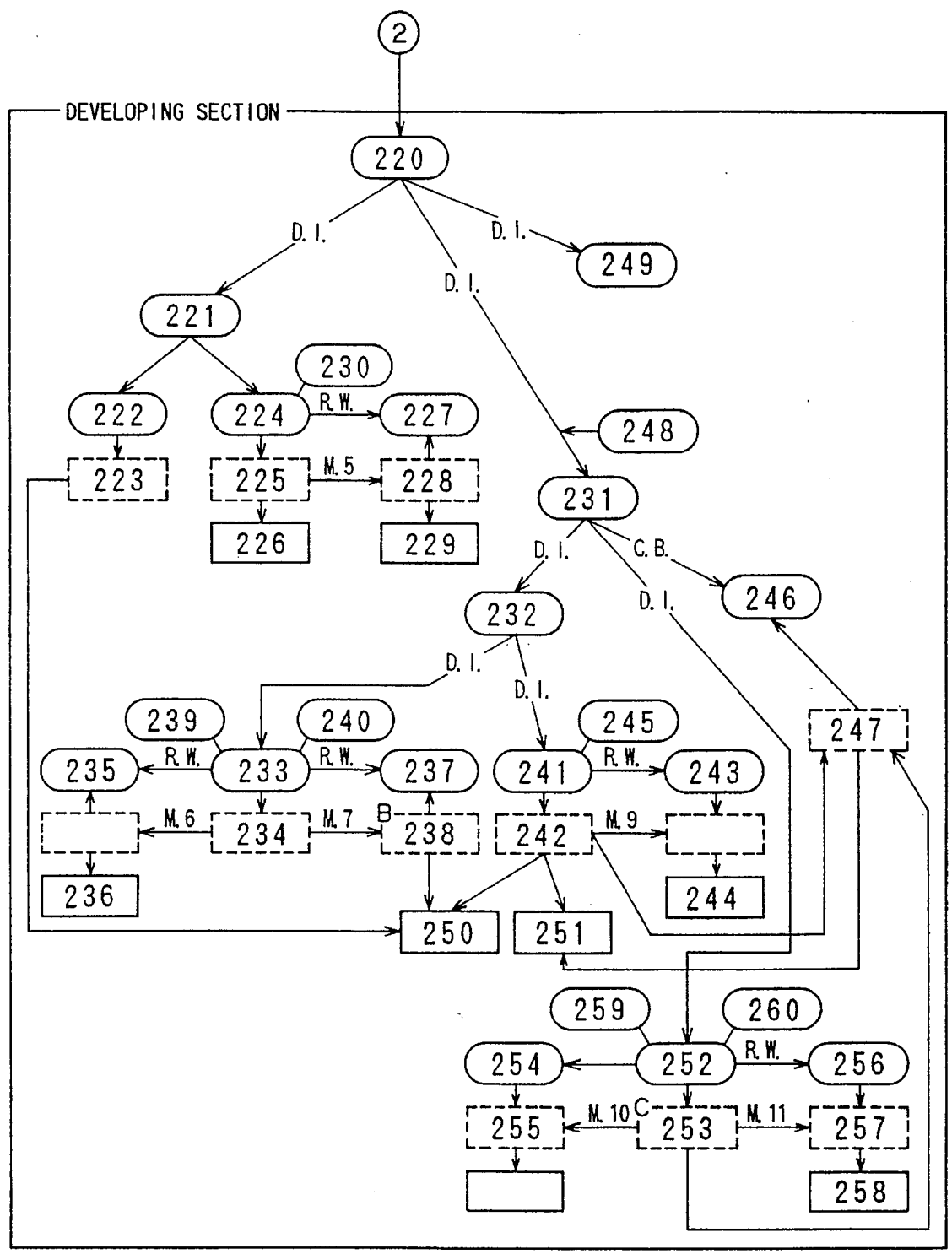
FIG. 2B is a diagram showing the function expanding structure of the developing section in the copying machine.
Figure 2C:
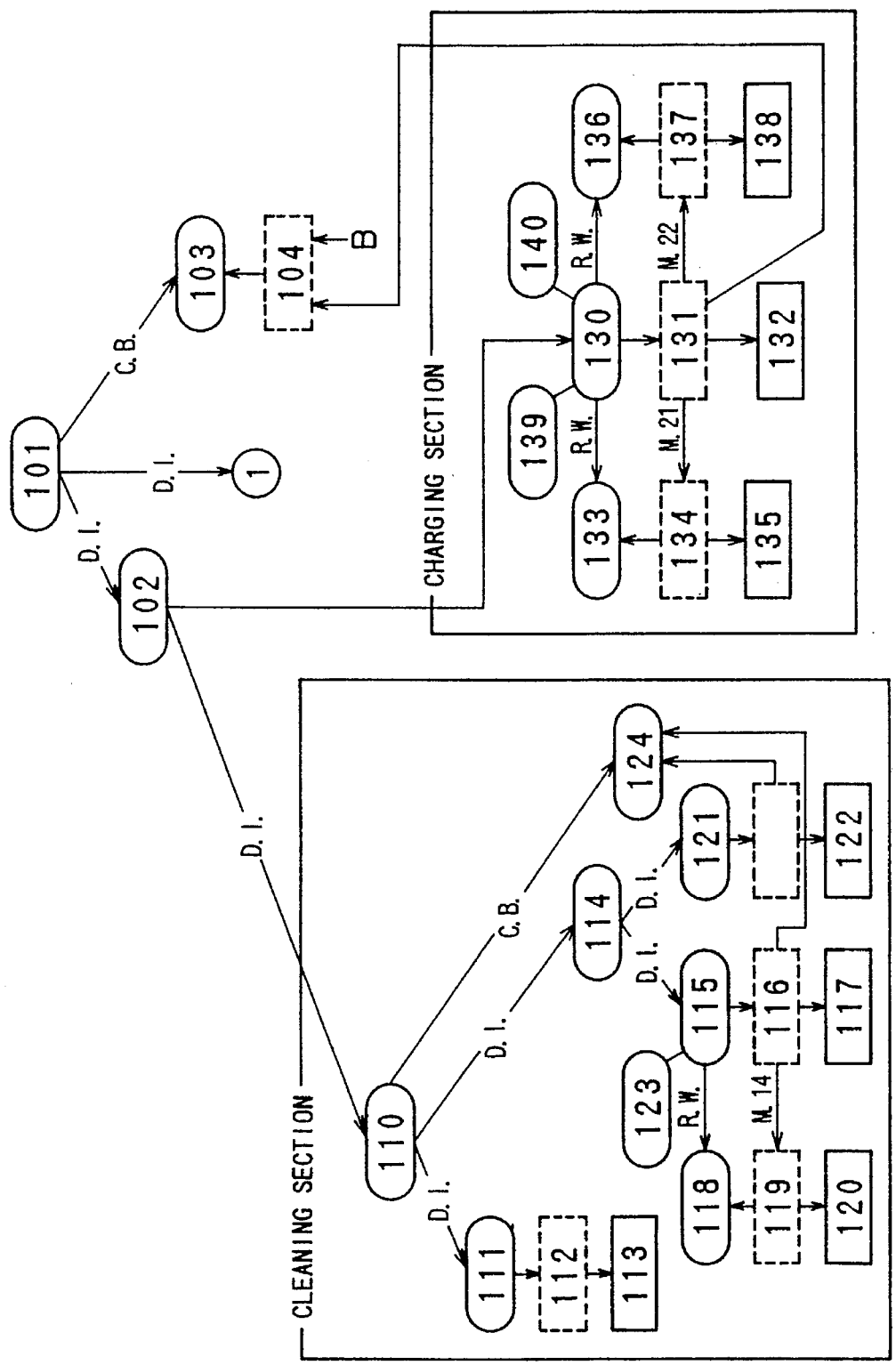
FIG. 2C is a diagram showing a function expanding structure of a cleaning section and a charging section in the copying machine.
Figure 2D:
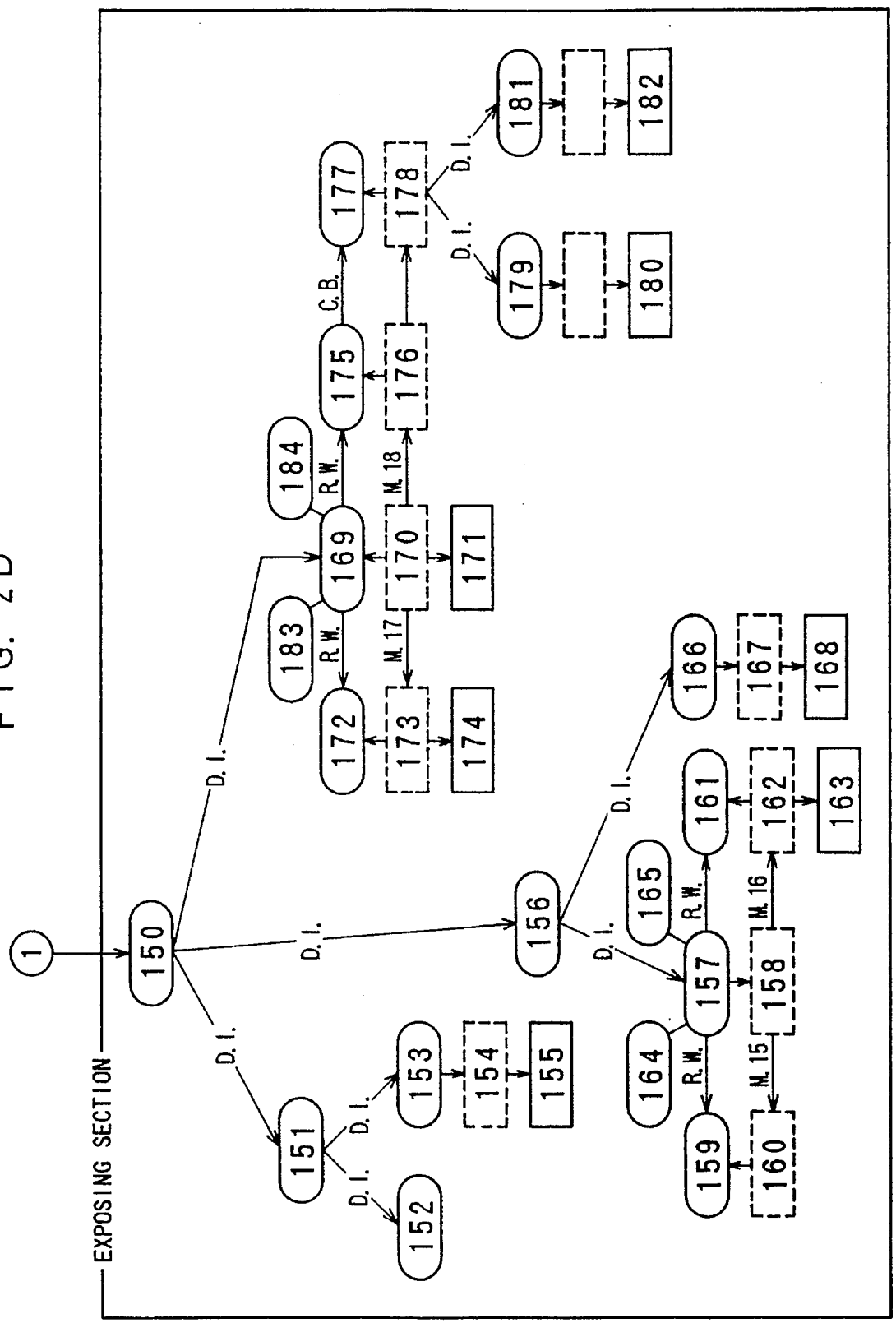
FIG. 2D is a diagram showing the function expanding structure of an exposing section in the copying machine.
Figure 2F:
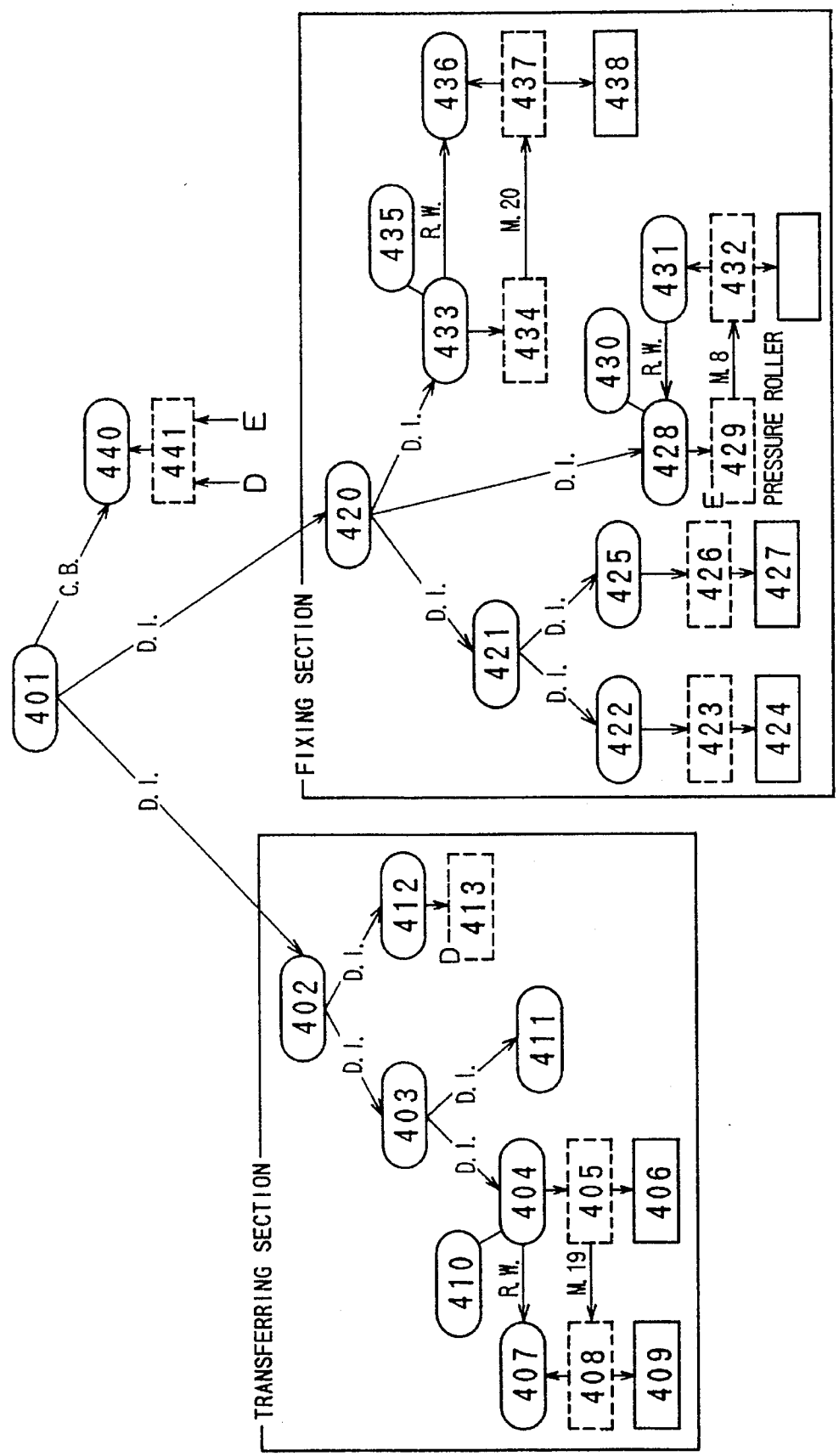
FIG. 2F is a diagram showing a function expanding structure of a transferring section and a fixing section in the copying machine.
Figure 2G:
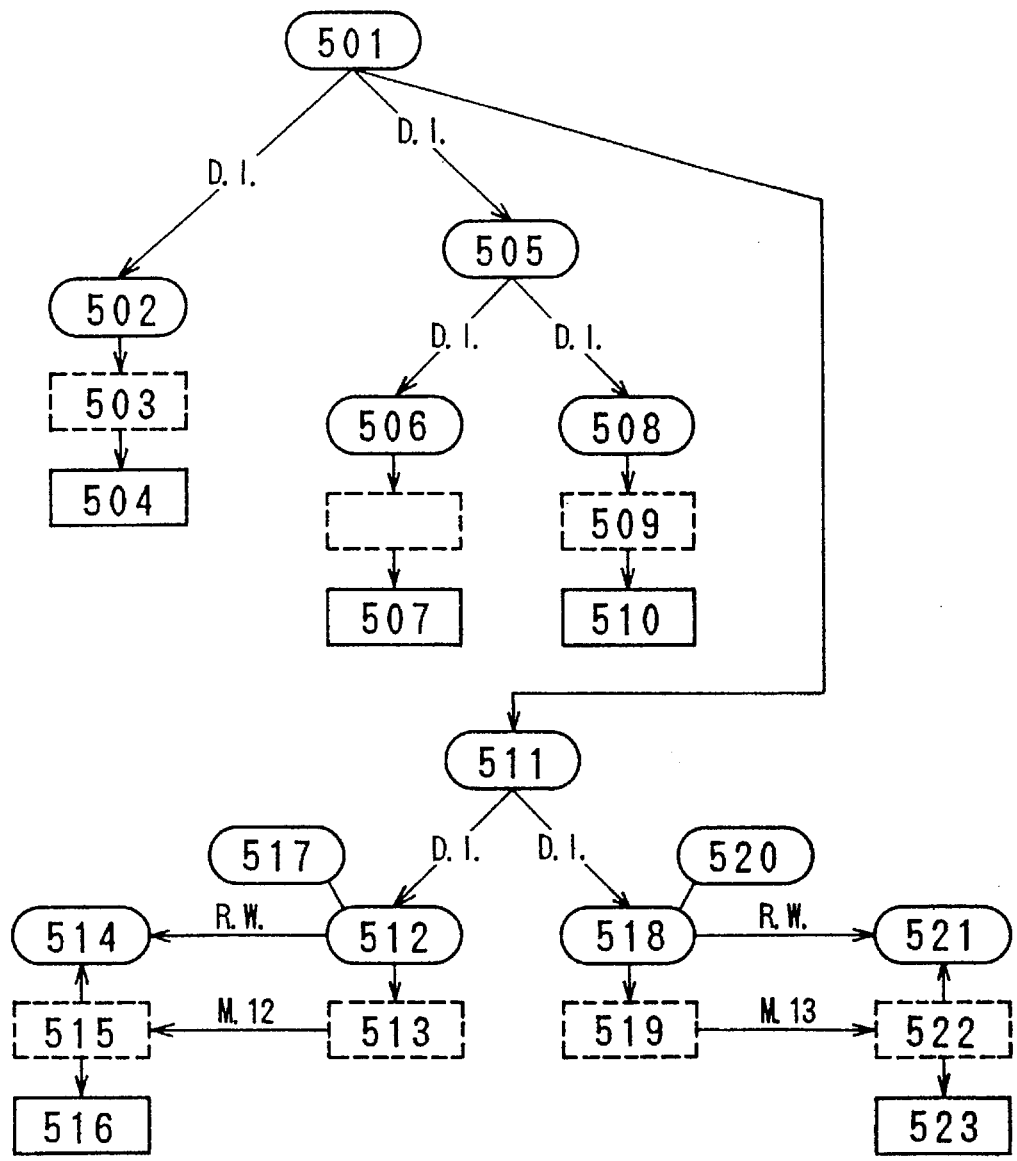
FIG. 2G is a diagram showing a function expanding structure of a paper feeding section in the copying machine.

FIG. 2A shows a whole function expanding structure in the copying machine. FIG. 2B illustrates an example of a function expanding structure of a developing section in the copying machine. FIG. 2C illustrates an example of a function expanding structure of a cleaning section and a charging section in the copying machine. FIG. 2D illustrates an example of a function expanding structure of an exposing section in the copying machine. FIG. 2E illustrates an example of a function expanding structure of a scanner section in the copying machine. FIG. 2F illustrates an example of a function expanding structure of a transferring section and a fixing section in the copying machine. FIG. 2G illustrates an example of a function expanding structure of a paper feeding section in the copying machine. In the drawings, the relations among the functions which are the results of the function expansion are respectively the recomposed—into relation, the caused—by relation and the reinforced—with relation.

In FIGS. 2A to 2G, each numerals and symbols indicates as follows:

101 . . . CONVERT DISTRIBUTION OF LIGHT INTENSITY INTO CHARGE DISTRIBUTION ON PHOTORECEPTOR (PHOTOCONDUCTIVITY)
102 . . . ADD CHARGE TO A PHOTORECEPTOR
103 . . . MOVE PHOTORECEPTOR
104 . . . MOVE CHARGING POINT TO EXPOSING POINT
110 . . . INITIALIZE PHOTORECEPTOR
111 . . . ERASE CHARGE ON A PHOTORECEPTOR
112 . . . PHOTOCONDUCTIVE EFFECT
113 . . . NEUTRALIZATION LAMP
114 . . . REMOVE FOREIGN MATERIAL ON PHOTORECEPTOR
115 . . . SCRATCH OUT FOREIGN MATERIAL
116 . . . FRICTION BY LINEAR PRESSURE
117 . . . CLEANING BLADE
118 . . . BRUSH OFF FOREIGN MATERIAL
119 . . . FRICTION BY FIBER
120 . . . FUR BRUSH
121 . . . STORE FOREIGN MATERIAL
122 . . . RECOVERY TANK
123 . . . Modifier 14: A LOT OF
124 . . . CONVEY FOREIGN MATERIAL
130 . . . GENERATE CHARGE
131 . . . CORONA DISCHARGE PHENOMENON
132 . . . CHARGE WIRE
133 . . . REMOVE FOREIGN MATERIAL ON WIRE
134 . . . WIPE
135 . . . WIRE CLEANING PAD
136 . . . STABILIZE DISCHARGE OF CHARGE
137 . . . EQUALIZE ELECTRICAL LOADING
138 . . . SHIELD CASE
139 . . . Modifier 21: STABLY
140 . . . Modifier 22: UNIFORMLY
150 . . . IRRADIATE DISTRIBUTION OF LIGHT INTENSITY TO PHOTORECEPTOR
151 . . . RECEIVE DISTRIBUTION OF LIGHT INTENSITY
152 . . . MOVE SIMILARLY TO LIGHT SOURCE
153 . . . CHANGE DIRECTION OF LIGHT
154 . . . REFLECTION
155 . . . FIRST MIRROR
156 . . . TRANSMIT A PART OF DISTRIBUTION OF LIGHT INTENSITY
157 . . . KEEP OPTICAL PATH LENGTH CONSTANT
158 . . . MOVE MIRROR
159 . . . RESTRAIN AMOUNT OF MOVEMENT OF MIRROR
160 . . . MOVE A PLURALITY OF MIRRORS
161 . . . DRIVE BY WIRE
162 . . . RESTRICT OPTICAL PATH LENGTH
163 . . . WIRE, PULLEY
164 . . . Modifier 15: EFFECTIVELY
165 . . . Modifier 16: ACCURATELY
166 . . . CHANGE DIRECTION OF LIGHT
167 . . . REFLECTION
168 . . . SECOND AND THIRD MIRRORS
169 . . . A PART IN DISTRIBUTION OF LIGHT INTENSITY IS IRRADIATED BY PHOTORECEPTOR
170 . . . REFLECTION
171 . . . FOURTH MIRROR
172 . . . BRING EXPOSED SURFACE NEAR FLAT SURFACE
173 . . . DETERMINE IRRADIATION RANGE
174 . . . SLIT
175 . . . MOVING SPACE IS NOT REQUIRED
176 . . . FIX MIRROR
177 . . . MOVE POSITION FOR IRRADIATION
178 . . . MOVE PHOTORECEPTOR
179 . . . GENERATE DRIVING FORCE
180 . . . MOTOR 181 ... TRANSFER DRIVING FORCE
182 ... GEAR
183 ... Modifier 17: CLEARLY
184 ... Modifier 18: SLIGHTLY
201 ... Modifier A: UNIFORMLY
202 ... Modifier B: QUICKLY
203 ... Modifier C: RESTRAIN OPERATING COST
204 ... Modifier D: WITHOUT DIRT
205 ... Modifier E: IN HIGH CONTRAST
206 ... Modifier F: WITH GOOD REPRODUCIBILITY
207 ... Modifier G: FOR A LONG TIME
208 ... Modifier H: SLIGHTLY
209 ... COPY TONE OF DOCUMENT ON TONE OF PAPER
210 ... SCANNER SECTION
211 ... CONVERT DISTRIBUTION OF LIGHT INTENSITY INTO TONE OF PLAIN PAPER
212 ... CONVERT DISTRIBUTION OF LIGHT INTENSITY INTO VISIBLE DISTRIBUTION
213 ... CLEANING, CHARGING, EXPOSING SECTIONS
214 ... MOVE PHOTORECEPTOR
215 ... MOVE FROM EXPOSING POINT TO DEVELOPING POINT
216 ... TRANSFERRING, FIXING SECTIONS
217 ... MOVE PHOTORECEPTOR
218 ... MOVE FROM DEVELOPING POINT TO TRANSFERRING POINT
219 ... PAPER FEEDING SECTION
220 ... CONVERT CHARGE DISTRIBUTION ON PHOTORECEPTOR INTO DIELECTRIC BODY DISTRIBUTION ON PHOTORECEPTOR (STATIC ELECTRICITY)
221 APPLY CHARGE TO DIELECTRIC BODY
222 INCLUDE DIELECTRIC BODIES WHICH DIFFER IN DIELECTRIC CONSTANT
223 ... FRICTIONAL ELECTRIFICATION PHENOMENON
224 ... AGITATE DIELECTRIC BODY
225 ... FRICTIONAL ELECTRIFICATION PHENOMENON
226 ... PADDLE
227 ... INCREASE FLOW SPEED OF DIELECTRIC BODY
228 ... INCREASE AGITATING ABILITY
229 ... PLURALITY OF PADDLES
230 ... Modifier 5: VIOLENTLY
231 ... SUPPLY DIELECTRIC BODY TO A PART OF CHARGES ON PHOTORECEPTOR (MAGNETIC BRUSH)
232 ... FORM PLANE IRON
233 ... ATTACH DIELECTRIC BODY TO CONDUCTOR
234 ... VAN DER WAALS FORCE
235 ... MAKE MIXTURE RATIO OF DIELECTRIC BODY AND CONDUCTOR CONSTANT
236 ... TONER CONTROL SENSOR, HOPPER
237 ... ATTACH DIELECTRIC BODY TO DIELECTRIC BODY
238 ... COULOMB FORCE
239 ... Modifier 6: STABLY
240 ... Modifier 7: VIOLENTLY
241 ... ATTACH CONDUCTOR TO PERMANENT MAGNET (MAGNETIC FORCE)
242 ... PLANE IRON STANDING PHENOMENON
243 ... MAKE SHADE OF DIELECTRIC BODY HORIZONTAL
244 ... SPIRAL
245 ... Modifier 9: UNIFORMLY
246 ... MOVE PLANE IRON
247 ... ROTATE
248 ... Modifier 101: SLIGHTLY
249 ... MOVE PHOTORECEPTOR
250 ... CARRIER
251 ... SLEEVE
252 ... BRING PLANE IRON INTO CONTACT WITH A PART 0F PHOTORECEPTOR
253 ... STATIC ADSORPTION PHENOMENON
254 ... INCREASE THE MEMBER OF DIELECTRIC BODIES ON WHICH STATIC ELECTRICITY IS EXERTED
255 ... DECREASE DISTANCE BETWEEN DRUM AND SLEEVE
256 ... KEEP RANGE ON WHICH STATIC ELECTRICITY IS EXERTED CONSTANT
257 ... MAKE HEIGHT OF PLANE IRON EQUAL
258 ... PLANE IRON CUTTING PLATE
259 ... Modifier 10: VIOLENTLY
260 ... Modifier 11: UNIFORMLY
301 ... CONVERT TONE OF DOCUMENT INTO DISTRIBUTION 0F LIGHT INTENSITY (REFLECTION OF LIGHT)
302 ... GENERATE LIGHT
303 ... LIGHT EMISSION PHENOMENON
304 ... JC LAMP
305 ... Modifier 100: LONGER
306 ... INTRODUCE LIGHT TO DOCUMENT
307 ... LIMIT RANGE OF IRRADIATION OF LIGHT
308 ... SHADING
309 ... BALANCE QUANTITY OF LIGHT
310 ... PARTIAL SHADING
311 ... LIGHT MODULATING PLATE
312 ... Modifier 1: UNIFORMLY
313 ... LIMIT DIRECTION OF IRRADIATION OF LIGHT
314 ... REFLECTION
315 ... MIRROR SURFACE
316 ... Modifier 2: EFFICIENTLY
317 ... INCREASE LUMINANCE IN ONE DIRECTION
318 ... LIGHT-GATHERING
319 ... CONCAVE SURFACE
320 ... MOVE LIGHT SOURCE
322 ... TRANSMIT DRIVING FORCE
323 ... STABILIZE FIRST MOVING FRAME
324 ... DRIVE BOTH
325 ... Modifier 3: EFFECTIVELY 326 ... GENERATE DRIVING FORCE
327 ... ? PHENOMENON
328 ... Modifier 4: SMOOTHLY
329 ... STABILIZE ROTATION
330 ... RESTRAIN COGGING
331 ... MOVE LIGHT SOURCE FROM REAR END OF DOCUMENT TO
332 ... TRANSMIT DRIVING FORCE
333 ... PULLEY WIRE
334 ... GENERATE DRIVING FORCE
335 ... ? PHENOMENON
336 ... MOTOR
401 ... FIX VISIBLE DISTRIBUTION TO PAPER
402 ... MOVE DISTRIBUTION OF DIELECTRIC BODIES ONTO PLAIN
403 ... CHARGE PLAIN PAPER
404 ... GENERATE CHARGE
405 ... CORONA DISCHARGING PHENOMENON
406 ... CHARGING WIRE
407 ... STABILIZE RELEASING OF CHARGE
408 ... EQUALIZE ELECTRIC LOAD
409 ... SHIELD CASE
410 ... Modifier 19: UNIFORMLY
411 ... TRANSFER CHARGE TO A PLAIN PAPER
412 ... MOVE DISTRIBUTION OF DIELECTRIC BODIES TO CHARGE ON PLAIN PAPER
413 ... STATIC ADSORBING PHENOMENON
420 ... FIX DIELECTRIC BODY ON PLAIN PAPER
421 ... MELT DIELECTRIC BODY
422 ... GENERATE HEAT
423 ... HEAT GENERATION
424 ... HEATER
425 ... APPLY HEAT TO DIELECTRIC BODY
426 ... HEAT TRANSFER
427 ... HEAT ROLLER
428 ... FIX MOLTEN DIELECTRIC BODY
429 ... PENETRATE INTO PLAIN PAPER
430 ... Modifier 8: QUICKLY
431 ... APPLY PRESSURE TO DIELECTRIC BODY
432 ... PRESSURE WELDING
433 ... SEPARATE PLAIN PAPER
434 ... STRIP PLAIN PAPER
435 ... Modifier 20: EASILY
436 ... NOT HANG FIBER OF PLAIN PAPER
437 ... RESTRAIN SURFACE ROUGHNESS
438 ... PFA TUBE ROLLER
440 ... MOVE PLAIN PAPER
441 ... MOVE TRANSFERRING POINT TO FIXING POINT
501 ... FEED PLAIN PAPER SHEETS ONE AT A TIME
502 ... STACK PLAIN PAPER
503 ... OCCUPY SPACE
504 ... TRAY
505 ... FEED PLAIN PAPER
506 ... GENERATE DRIVING FORCE
507 ... MOTOR
508 ... TRANSMIT DRIVING FORCE TO PLAIN PAPER
509 ... FRICTION
510 ... FEED ROLLER
511 ... SEPARATE PLAIN PAPER SHEETS
512 ... MOVE PLAIN PAPER WHICH IS UPPERMOST ONE IN THE DIRECTION OF NON-DISCHARGE
513 ... FRICTION
514 ... COEFFICIENT OF FRICTION IS NOT EASILY CHANGED
515 ... PERFORMANCE OF RESISTING WEAR IS GOOD
516 ... BELOW RETARD ROLLER
517 ... Modifier 12: LONGER
518 ... MOVE UPPERMOST PLAIN PAPER IN THE DIRECTION OF
519 ... FRICTION
520 ... Modifier 13: LONGER
521 ... COEFFICIENT OF FRICTION IS HARD TO CHANGED
522 ... PERFORMANCE OF RESISTING WEAR IS GOOD
523 ... BELOW RETARD ROLLER Functional Amount and Negotitaions among Functions It is considered that a designer increases the information content of a function itself by using a functional modifier to realize functional representation close to the required specification. As the specification is defined, the function is expanded to a more concrete form and at the same time, representation modifying the function is embodied as a restriction on the function.

As apparent from the examples of the function expanding structure of the copying machine shown in FIGS. 2A to 2G, however, the embodiment of a functional modifier is not monotonous with respect to the expansion of a function. As a function in the destination of modification is expanded, a functional modifier is changed into different modifying representation in the destination of the expansion. Further, the functional modifier is not distributed among all partial functions (or realization behaviors). That is, how the representation modifying the function is changed as the function is expanded depends on a method of dividing the function into partial functions in a task manner or in a cause and effect manner. However, the task division of the function is generally left to the subject of the designer. Consequently, the same is true for the embodiment of the functional modifier.

In order to realize concept design support and maintenance using a computer, the embodied functional modifier must be objectively represented. In the present invention, the embodied functional modifier is represented by a "functional amount".

If the "functional amount" is taken as F (p), F (p) is defined by the following equation:

$$F(p) = -\log_2(1-p)$$

In the foregoing equation, p is a probability value of subjectivity. The probability value of subjectivity is extracted using a psychological evaluation method which is referred to as an SD (Semantic Differential) method ("Sensitivity Engineering" by Sansei Nagamachi, published by Kaibundo Publishing Co., Ltd., 1988).

If the embodied functional modifier is represented by a functional amount, the degree of replenishment of a function with a representation modifying the function can be represented. The degree of replenishment with the modifying representation can be regarded as a function developed state. As a mode for representing the difference in the function developed state, a function mode ("Reliability Engineering" by Hiroyuki Yoshikawa, published by Corona Publishing Co., Ltd., 1979) has been known. The function mode is defined as a partial set of phases in a function space based on a state set. However, the function developed state represented by the difference in the function mode remains so binary that the function is developed/is not developed. Therefore, the degree of replenishment with the modifying representation, that is, quantitative representation by the functional amount can be overlapped with the function mode, thereby to make it possible to represent the function developed state of an objective machine in more detail.

On the other hand, if the design or the maintenance is seen from a functional viewpoint, the developed states of a plurality of functions are adjusted, thereby to realize the entire function. A balance among the plurality of different functions shall be referred to as "negotiations among functions". Information on the difference among the developed states of functions which is required in conducting the negotiations among functions is represented by a combination of the function mode and the functional amount, thereby to make it possible to model the negotiations among functions in a calculable form. The overall negotiations among functions can be realized by a combination of extraction of a negotiation mode by a mechanism for searching for a physical cause and effect relation and previous determination of the fixed priorities to the functions from the viewpoint of a greatest common divisor.

Example of Self-repair Function According to the Present Invention

FIG. 3 is a conceptual diagram showing the construction of a self-repair type copying machine to which one embodiment of the present invention is applied. The copying machine comprises a main body of a copying machine 1 and a control device 2, which are connected to each other by an interface 3.

A photoreceptor 20, and a main charger 3, a developing device 4, a transferring corona discharger 5, a separating corona discharger 6, a cleaning device 7 and a neutralization lamp 8 which are disposed in the direction of the rotation of the photoreceptor 20 around the photoreceptor 20, which are conventional known, are disposed in the main body of the copying machine 1. Further, the main body of the copying machine 1 comprises a halogen lamp unit 9 for illuminating and scanning a document and an optical system 10 for introducing into the photoreceptor 20 reflected light from the document.

The surface of the photoreceptor 20 is uniformly charged by corona discharges induced by the main charger 3. A document (not shown) set on the main body of the copying machine 1 is illuminated and scanned by the halogen lamp unit 9. The reflected light from the document is introduced by the optical system 10, to expose the surface of the photoreceptor 20 uniformly charged. Consequently, an electrostatic latent image corresponding to a document image is formed on the photoreceptor 20. The electrostatic latent image is developed into a toner image by the developing device 4. The toner image is transferred onto a paper sheet (not shown) which is brought into contact with the photoreceptor 20 by corona discharges induced by the transferring corona discharger 5. After the transfer, the paper sheet is separated from the photoreceptor 20 by corona discharges induced by the separating corona discharger 6. Toner particles remaining on the surface of the photoreceptor 20 after the paper sheet is separated are recovered by the cleaning device 7. Thereafter, the entire surface of the photoreceptor 20 is exposed by the neutralization lamp 8, thereby to remove remaining charges.

A voltage from a lamp voltage circuit A1 is applied to the halogen lamp unit 9. A high voltage is applied from a charging high voltage unit A3 to the main charger 3. High voltages are respectively applied from a transferring high voltage unit A4 and a separating high voltage unit A5 to the transferring corona discharger 5 and the separating corona discharger 6. A voltage from a developing bias circuit A2 for applying a developing bias to a portion between the circuit A2 and the photoreceptor 20 is applied to the developing device 4. Power from a lamp driving circuit A6 is supplied to the neutralization lamp 8.

An image formed in the main body of the copying machine 1 is changed depending on the quantity of light for document illumination using the halogen lamp unit 9, a potential at which the photoreceptor 20 is charged by the main charger 3, and a developing DC bias voltage of the developing device 4o Therefore, the lamp voltage circuit A1, the charging high voltage unit A3 and the developing bias circuit A2 for respectively applying voltages to the halogen lamp unit 9, the main charger 3 and the developing device 4 are actuators controlled by the control device 2.

Furthermore, the transferring high voltage unit A4, the separating high voltage unit A5 and the lamp driving circuit A6 are also actuators controlled by the control device 2.

Additionally, the main body of the copying machine 1 is provided with three sensors, for example. That is, the three sensors are a light quantity sensor S1 for detecting the quantity of light for exposing the photoreceptor 20, a surface potential sensor S2 for detecting a surface potential of the photoreceptor 20 after the exposure, and a toner density sensor S3 for detecting the toner density (the remaining toner density) on the surface of the photoreceptor 20 after the transfer and separation. Detection outputs of the three sensors S1 to S3 are applied to the control device 2 through the interface 3.

The control device 2 comprises a CPU for carrying out control and a memory on which various types of programs and data required for the control are recorded.

FIG. 4 illustrates the contents stored in the memory included in the control device 2. The memory stores the following six data and the following nine programs (subroutines), for example:

D1: functional amount data,

D2: objective model data,

D3: repair operation knowledge,

D4: quantitative information related to an objective machine,

D5: fault judgment knowledge,

D6: function expanding structure data, and

S1: a digital signal/symbol conversion program,

S2: a fault diagnosis program,

S3: a simulation program,

S4: a functional amount conversion/judgment program,

S5: a functional redundancy candidate search program,

S6: a parameter repair candidate search program,

S7: a symbol/digital signal conversion program,

S8: a qualitative sequence formation program,

S9: a quantitative sequence formation program.

Figure 8:
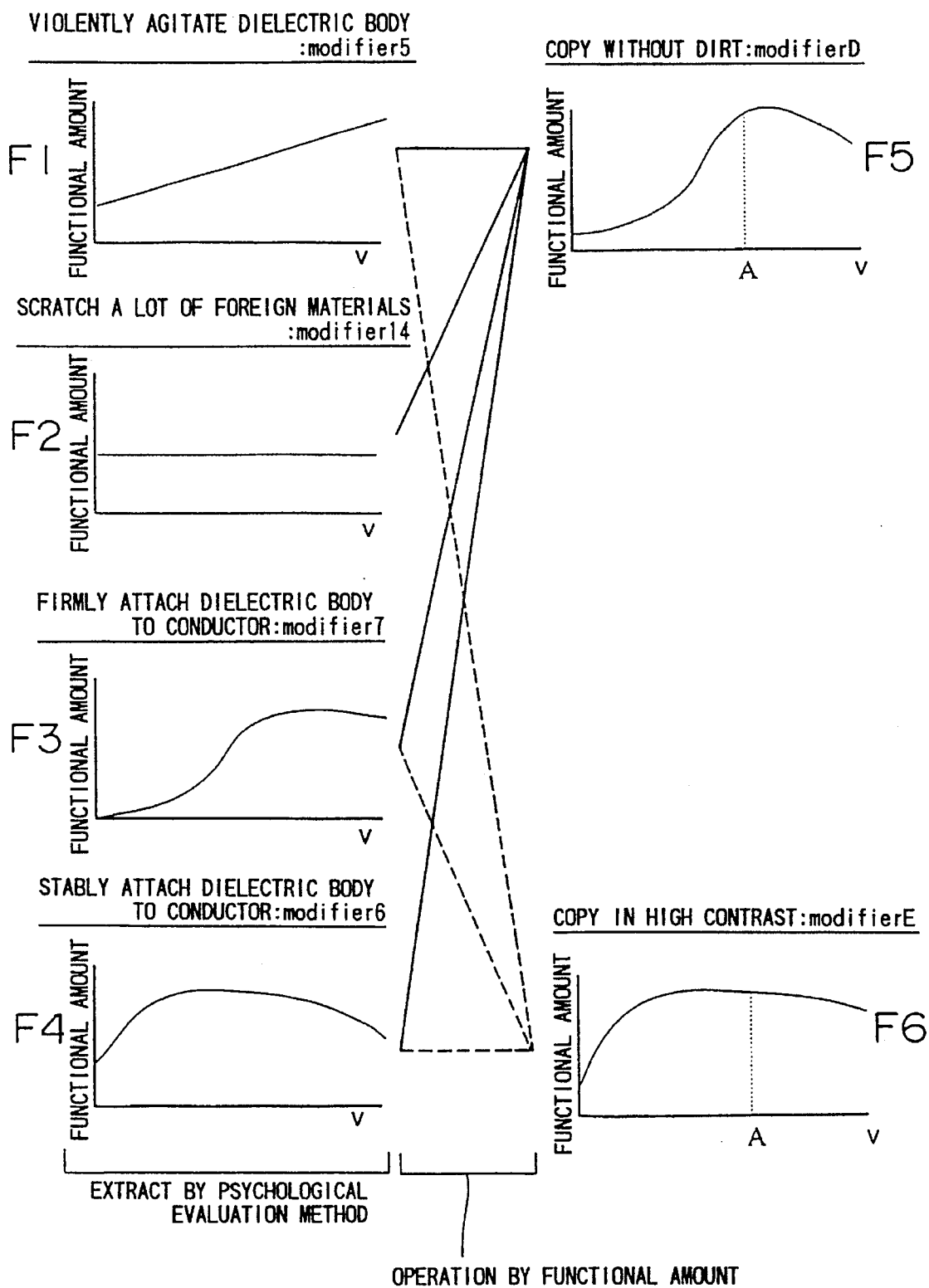
FIG. 8 is a diagram for explaining functional amount data and processing in a functional amount converting/judging unit 47.

Examples of the functional amount data D1 out of the contents stored in the memory are four data indicated in the left column of FIG. 8 as described later, that is, F1 "violently agitate a dielectric body: m5", F2 "scratch a lot of foreign materials: m14", F3 "firmly attach a dielectric body to a conductor: m7", and F4 "stably attach a dielectric body to a conductor: m6". The functional amount data F1 to F4 are previously extracted by the above described psychological evaluation method referred to as the SD method.

The function expanding structure data D6 out of the contents stored in the memory shown in FIG. 4 is the above described data shown in FIGS. 2A to 2G.

The other data D2 to D5 are described in detail in U.S. patent application Ser. No. 07/588,191 (issued as U.S. Pat. No. 5,166,934) and hence, the description thereof is not repeated.

FIG. 5 is a block diagram for explaining the construction of the control device 2 shown in FIG. 3. In FIG. 5, a processing function performed by a CPU (Central Processing Unit) is divided into functional blocks.

The control device 2 diagnoses a fault on the basis of outputs of sensors S1, S2 and S3 provided in the main body of the copying machine 1. Further, a repair plan for repairing the diagnosed fault is prepared. At the time of preparing the repair plan, a manipulated variable is determined on the basis of a functional amount, or a repair candidate is selected, as described later. The actuators, that is, the lamp voltage circuit A1, the developing bias circuit A2, the high voltage units A3, A4 and A5 and/or the lamp driving circuit A6 are controlled on the basis of the prepared repair plan.

Outputs of the plurality of sensors S1, S2 and S3 are applied to an interface 3. The interface 3 comprises an amplifier circuit 31 and an analog-to-digital (A/D) converter circuit 32. Sensor signals are amplified by the amplifier circuit 31, and then converted into a digital signal by the A/D converter circuit 32. The digital signal is applied to a digital signal/symbol converting unit 41.

The digital signal/symbol converting unit 41 converts the applied digital signal into qualitative data on the basis of the digital signal/symbol conversion program S1 stored in the memory. That is, the digital signal is converted into any one of three symbols, that is, N (Normal), H (High) and L (low). The signals applied from the sensors S1, S2 and S3 are converted into such symbolized qualitative information, thereby to make an approach to the fault diagnosis easy.

In converting the digital signal into a symbol in the digital signal/symbol converting unit 41, the object model data D2 which is stored in an objective model storing unit 42 is referred to.

The symbols obtained by the conversion in the digital signal/symbol converting unit 41 are not limited to the above described symbols N, H and L. For example, the symbols may be the other representation such as ON and OFF or A, B, C and D. Alternatively, the symbols may be fuzzy qualitative values, as described in U.S. patent application Ser. No. 07/833,685 (issued as U.S. Pat. No. 5,452,438) according to the prior application of the present applicant.

An output of the digital signal/symbol converting unit 41 is applied to a fault diagnosing unit 43. The fault diagnosing unit 43 judges the presence or absence of a fault in the main body of the copying machine 1 on the basis of the fault diagnosis program S2 and the fault judgment knowledge D5 which are stored in the memory, to diagnose, if there is a fault, the fault. The fault diagnosing unit 43 further applies the symbol to a simulation unit 44. In the simulation unit 44, the applied symbol and the objective model data D2 which is read out of the objective model storing unit 42 are applied to the simulation program S3 stored in the memory, to simulate the state of the fault in the main body of the copying machine 1. The state of the fault is represented by the change of a parameter model and is applied to the fault diagnosing unit 43.

A repair plan unit 45 infers, when a signal indicating that there is a fault is applied from the fault diagnosing unit 43, a repair plan for repairing the fault, and derives repair work.

The inference of the repair plan and the derivation of the repair work are first achieved on the basis of the parameter repair candidate search program S6 stored in the memory. In executing the program, the objective model data D2, the repair operation knowledge D3 and the function expanding structure data D6 are made use of.

If the repair cannot be made by the parameter repair candidate search program S6, a repair plan is inferred by the functional redundancy candidate search program S5, to derive repair work. In executing the functional redundancy candidate search program S5, the function expanding structure data D6 is made use of.

When the functional redundancy candidate search program S5 is executed, the potential function of another part capable of developing a function which failed is searched for by the function expanding structure data D6. If the potential function of another alternative part is found, a qualitative sequence in the main body of copying machine 1 which has been repaired by the functional redundancy is formed using the qualitative sequence formation program S8 stored in the memory in a qualitative sequence forming unit 48. Further, quantitative data is added to the formed qualitative sequence using the quantitative sequence formation program S9 in a quantitative timing chart producing unit 49. The quantitative information D4 related to an objective machine which is stored in a quantitative information storing unit 50 is used for the processing in the quantitative timing chart producing unit 49.

A concrete example of inference processing using the functional redundancy candidate search program S5, the qualitative sequence formation program S8 and the quantitative sequence formation program S9 is disclosed in detail in U.S. patent application No. 07/989,512, for example, which is the prior application of the present applicant.

Furthermore, the state of the main body of the copying machine 1 which has been inferred by the repair plan unit 45 and subjected to the derived repair work is simulated in the simulation unit 44. When the simulation unit 44 simulates the state of the copying machine, the data stored in the objective model storing unit 42 is referred to, as in the case of the above described simulation of the state of the fault. The result obtained by the simulation in the simulation unit 44 is applied to the repair plan unit 45. In the repair plan unit 45, the inferred repair plan is corrected and the other repair plan is inferred on the basis of the result of the simulation.

The above described functional amount data D1 is stored in a functional amount data storing unit 46. A functional amount converting/judging unit 47 judges using a functional amount replacement/judgment program stored in the memory to what extent each of the functions of the main body of the copying machine 1 is developed when the state of the fault in the main body of the copying machine 1 which is represented by qualitative symbol data is applied from the fault diagnosing unit 43. That is, the functional amount of the developed function is judged by referring to the functional amount data D1 stored in the functional amount data storing unit 46. The result of the judgment is applied to the fault diagnosing unit 43. It is possible to make more accurate fault diagnosis in the fault diagnosing unit 43 by referring to the judged functional amount.

Furthermore, the functional amount converting/judging unit 47 finds, when it receives the repair plan and the repair work from the repair plan unit 45, the functional amounts of the respective functions developed by the repair. The functional amount converting/judging unit 47 judges the most desirable manipulated variable for repair from comparison between the functional amounts, to output the result of the judgment to the repair plan unit 45.

The repair work which is finally determined in the repair plan unit 45 or in which a qualitative sequence and quantitative timing are respectively determined in the qualitative sequence forming unit 48 and the quantitative timing chart producing unit 49 is converted into a digital signal in a symbol/digital signal converting unit 51. In this case, the symbol/digital signal conversion program S7 is used.

The digital signal obtained by the conversion is converted into an analog signal in a digital-to-analog (D/A) converter circuit 33 provided in an interface 3, and the analog signal is applied to the lamp voltage circuit A1, the developing bias circuit A2, the high voltage units A3, A4 and A5 and/or the lamp driving circuit A6 which serve as actuators to be controlled through a control circuit 34, to control the circuits. Consequently, the occurring fault is self-repaired.

Figure 6:
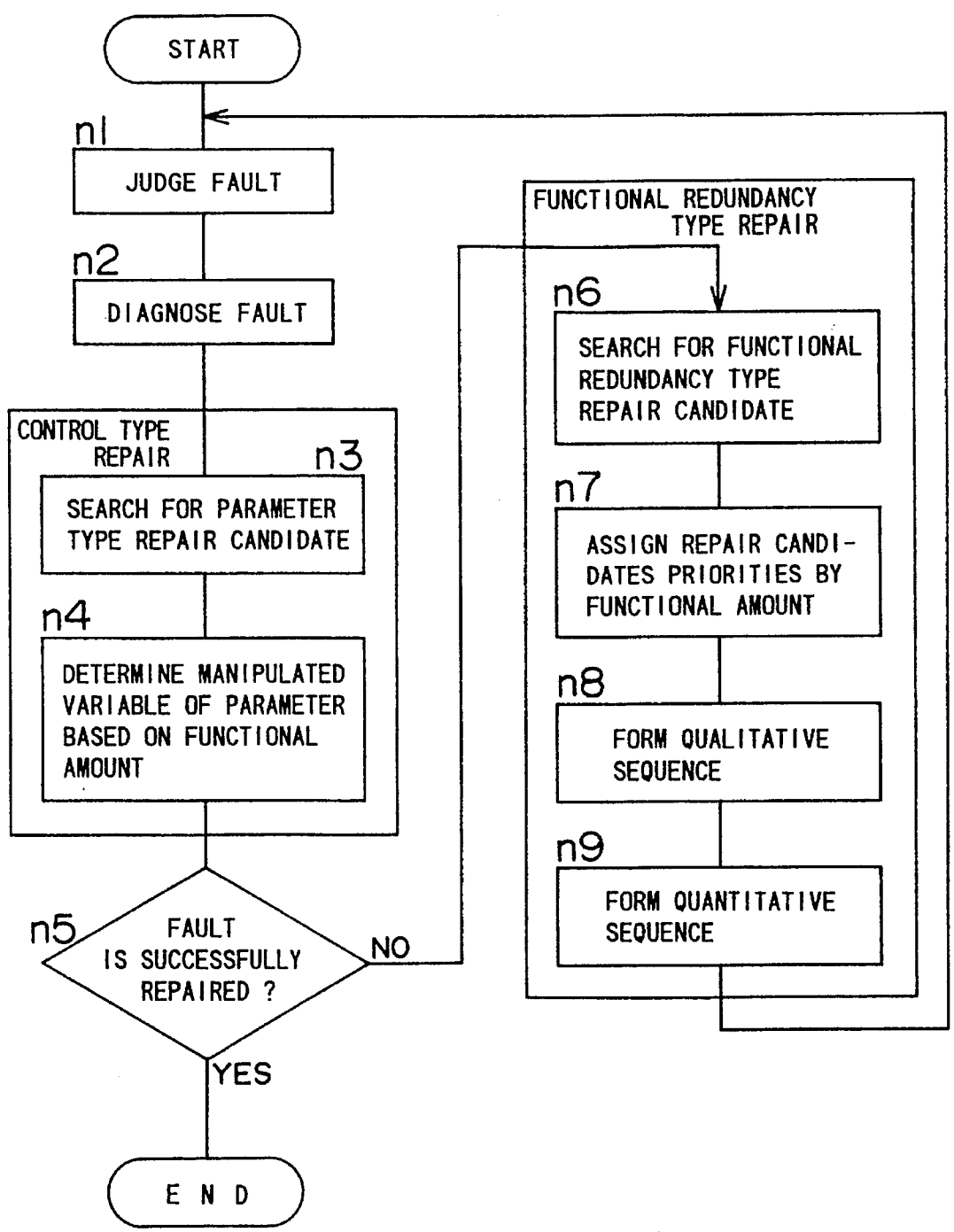
FIG. 6 is a flow chart showing operations performed by the control device 2.

FIG. 6 is a flow chart showing operations performed by the control device 2 shown in FIG. 5. Description is made of the operations performed by the control device 2 shown in FIG. 5 along the flow of FIG. 6, which is somewhat overlapped with the description of FIG. 5.

In the step n1, it is first judged in the fault diagnosing unit 43 whether or not a fault occurs. If it is judged that a fault occurs, the fault is diagnosed in the fault diagnosing unit 43 in the step n2.

In order to repair the diagnosed fault, a parameter type repair candidate based on the repair operation knowledge is then searched for in the repair plan unit 45 in the step n3. In the step n4, a manipulated variable of a repair candidate parameter is determined on the basis of a functional amount in the functional amount converting/judging unit 47.

Control type repair processing performed in the steps n3 and n4 will be described in more detail.

FIG. 7 is a diagram showing a parameter model of the main body of the copying machine 1 used for judgment related to a secondary effect, which is a part of the objective model data D2. The parameter model is used for judging the secondary effect between the output image density and contrast between images. Alphabetic characters in FIG. 7 are physical parameters required for image formation, and the physical parameters are affected by each other in a tree shape as shown. For example, a halogen lamp quantity of light X is changed depending on a halogen lamp output HL and a document density D. Specifically, if HL is raised or D is lowered, X is raised. On the contrary, if HL is lowered or D is raised, X is lowered.

Similarly, an output image density Os is changed in proportion to the product of a toner density on a drum Ds and an output Vt of the transferring corona discharger. When Os is changed, therefore, the cause thereof may be the change of Ds or Vt.

If a fault symptom "the decrease in density of a solid portion", for example, is applied to the repair plan unit 45 from the fault diagnosing unit 43, the repair plan unit 45 infers such repair work as to raise an output Vn of the main charger 3. The result of the inference is applied to the simulation unit 44, where the state of the main body of the copying machine 1 in a case where the repair work is performed is simulated. As a result, "raise image contrast Ic" is raised as a secondary effect on the basis of the parameter model shown in FIG. 7, and is applied to the repair plan unit 45.

The repair plan unit 45 applies the inferred repair work and the simulated secondary effect to the functional amount converting/judging unit 47. Correspondingly, the functional amount converting/judging unit 47 determines a manipulated variable of a parameter corresponding to a functional amount. The method of determination will be described with reference to FIG. 8.

First, the functional amount converting/judging unit 47 calculates functional amount data F5 and F6 related to two upper concept functions "copy a solid portion without dirt: mD" and "copy with a high contrast: mE" required this time on the basis of the four functional amount data which are stored in the functional amount data storing unit 46, for example, F1: "violently agitate a dielectric body: m5", F2: "scratch a lot of foreign materials: m14", F3: "firmly attach a dielectric body to a conductor: m7", and F4: "stably attach a dielectric body to a conductor: m6".

"m + a numeral or a capital letter of the alphabet" attached to each of the above described lower concept functional amount data and the above described upper concept functional amount data indicates the number of the functional modifier in each of the function expanding structures shown in FIGS. 2A to 2G as previously described.

The upper concept functional amount data F5 is found by the following equation, for example:

$$F5 = \alpha_1 F1 + \alpha_2 F2 + \alpha_3 F3 + \alpha_4 F4$$

where $\alpha_1$, $\alpha_2$, $\alpha_3$ and $\alpha_4$ are weights.

Similarly, the functional amount data F6 is given by the following equation:

$$F6 = \beta_1 F1 + \beta_2 F2 + \beta_3 F3 + \beta_4 F4$$

where $\beta_1$, $\beta_2$, $\beta_3$ and $\beta_4$ are weights.

Such a method of calculating the functional amount data is more specifically described in more detail in U.S. patent application Ser. No. 08/344,812 according to the prior application of the present applicant.

In the functional amount converting/judging unit 47, a balance, that is, negotiations between two functions, that is, the calculated functional amount data F5: "copy a solid portion without dirt" and F6: "copy with a high contrast" are conducted, to determine the speed v of a developing agent capable of developing more functions. That is, the most suitable points A in the data F5 and F6 are determined.

As described in the foregoing, in the functional amount converting/judging unit 47, the required upper concept functional amount is presumed from the functional amount data stored in the functional amount data storing unit 46, to conduct negotiations between the functions with respect to the functional amount.

Returning to FIG. 6, if the processing in the step n4 is terminated, it is judged in the step n5 whether or not the fault is successfully repaired. It is judged by reading the data in the sensors S1, S2 and S3, for example, whether or not the function is successfully repaired. If the fault is successfully repaired, the processing is terminated.

If the fault is not successfully repaired, functional redundancy type repair is then made.

Specifically, in the step n6, a functional redundancy type repair candidate is searched for in the repair plan unit 45. "Functional redundancy" means "use a part which originally exists in a machine and utilize the potential function of the part to make use of the potential function in place of the other function".

In the repair based on the functional redundancy, a plurality of repair candidates may be derived in many cases.

Therefore, in the step n7, a plurality of repair candidates searched for by the repair plan unit 45 are assigned priorities in the functional amount converting/judging unit 47. The functional redundancy type repair candidates are assigned priorities by comparing the average functional amount of a function developed in the functional redundancy system found by the search. The average functional amount is taken as $F_M$. $F_M$ indicates the degree of expectation to a function, and is expressed by the following equation (1). $P_i$ denotes a probability value of subjectivity.

$$F_M = - \sum_{i=1}^{m} p_i \log_2 (1 - P_i) \tag{1}$$

This average functional amount $F_M$ has features as shown in FIG. 9. For example, in a function A, there exists an agreement on development of the function in the population of a functional amount, whereby the average functional amount is increased. On the other hand, in a function B, there exists no agreement on development of the function in the population of a functional amount, whereby the average functional amount is decreased.

In the functional redundancy system, repair candidates are thus assigned priorities in descending order of the average functional amount related to a function to be paid attention to.

Returning to FIG. 6 again, a repair candidate is determined in the step n7, after which a qualitative sequence is formed in the qualitative sequence forming unit 48 in the step n8. A quantitative sequence is then formed in the quantitative sequence forming unit 49 in the step n9. The formation of the qualitative sequence and the quantitative sequence is described in detail in U.S. patent application No. 07/989,512 (issued as U.S. Pat. No. 5,346,314) according to the prior application of the present applicant and hence, the description thereof is not repeated.

If a lost function is developed by the functional redundancy type repair, the program is returned to the step n1, where the developed function is evaluated and confirmed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A self-repair type image forming apparatus having a self-repair function for self-repairing a fault when there occurs such a fault that a predetermined function does not develop sufficiently, said self-repair type image forming apparatus utilizing functional representation, and comprising:

first storing means for storing a function expanding structure in which at least a portion to be self-repaired is represented as a network including a hierarchical structure of a plurality of functions and a plurality of behaviors and states realizing the plurality of functions, and predetermined functions belonging to a relatively lower-order hierarchy are respectively assigned functional modifiers for modifying the functions;

second storing means for storing functional amount data, which is previously examined in conformity with each of said functional modifiers, representing the change in a functional amount with the change of a predetermined physical parameter;

third storing means for storing a parameter tree in which at least a structure of a portion to be self-repaired is represented as a cause and effect relation among a plurality of physical parameters;

means for applying, when a fault occurs, the state of the fault to the parameter tree stored in said third storing means, to raise a physical parameter to be operated so as to repair the fault;

means for calculating a manipulated variable of said raised physical parameter on the basis of the functional amount data stored in said second storing means; and means for operating the raised physical parameter to self-repair the function on the basis of said calculated manipulated variable.

2. The self-repair type image forming apparatus utilizing functional representation according to claim 1, further comprising:

means for raising, when the fault cannot be repaired by operating said physical parameter, an alternative part, having as a potential function, a function which is not developed due to the fault on the basis of the function expanding structure stored in said first storing means, means for selecting, when a plurality of alternative parts are raised, a part suitable for function development on the basis of the functional amount data stored in said second storing means, and redundancy function development controlling means for developing the function which is not developed due to the fault by the selected part.

* * * * *